United States Patent
Peng

(10) Patent No.: US 11,623,475 B2
(45) Date of Patent: Apr. 11, 2023

(54) SOCKET STRUCTURE

(71) Applicants: Chia-Hui Peng, Taichung (TW);
Hsiao-Fen Peng, Taichung (TW);
Hsiao-Ting Peng, Taichung (TW);
Wen-Han Peng, Taichung (TW);
Chun-Hsiang Peng, Taichung (TW)

(72) Inventor: Chia-Hui Peng, Taichung (TW)

(73) Assignees: Chia-Hui Peng, Taichung (TW);
Hsiao-Fen Peng, Taichung (TW);
Hsiao-Ting Peng, Taichung (TW);
Wen-Han Peng, Taichung (TW);
Chun-Hsiang Peng, Taichung (TW)

( * ) Notice: Subject to any disclaimer, the term of this patent is extended or adjusted under 35 U.S.C. 154(b) by 124 days.

(21) Appl. No.: 16/850,020

(22) Filed: Apr. 16, 2020

(65) Prior Publication Data
US 2021/0323349 A1    Oct. 21, 2021

(51) Int. Cl.
*B60B 29/00*    (2006.01)

(52) U.S. Cl.
CPC .......... *B60B 29/003* (2013.01); *B60B 29/006* (2013.01)

(58) Field of Classification Search
CPC ..... B60B 29/003; B60B 29/006; B25B 13/06; B25B 13/065; B25B 13/48
USPC ....................................................... 81/121.1
See application file for complete search history.

(56) References Cited

U.S. PATENT DOCUMENTS

| 2004/0216567 | A1* | 11/2004 | Hsien | ............ | B25B 13/06 81/124.6 |
| 2012/0025437 | A1* | 2/2012 | Allred, III | ............ | B29C 70/34 269/249 |
| 2014/0053692 | A1* | 2/2014 | Hu | ............ | B25B 13/06 81/121.1 |
| 2017/0028538 | A1* | 2/2017 | Lourenco | ............ | B25B 23/005 |

* cited by examiner

*Primary Examiner* — Joseph J Hail
*Assistant Examiner* — Caleb Andrew Holizna
(74) *Attorney, Agent, or Firm* — Leong C. Lei

(57) ABSTRACT

A socket structure includes a socket body, an O-ring, and a carbon-fiber tube. The socket body includes a driving section and an acting section coaxially connected to the driving section. The driving section has an outside diameter greater than an outside diameter of the acting section and a stepped portion is formed in outer circumference between the driving section and the acting section. The driving section and the acting section have end faces that are recessed inwardly to form a driving hole and an acting hole, respectively. The outer circumferential surface of the acting section is formed with a circumferential groove in which the O-ring is received. The carbon-fiber tube is fit over the outer circumferential surface of the acting section of the socket body and has an end in abutting engagement with the stepped portion and an internal circumferential surface in contact with the O-ring.

6 Claims, 3 Drawing Sheets

SOCKET STRUCTURE

TECHNICAL FIELD OF THE INVENTION

The present invention relates generally to an accessory of pneumatic tools, and more particularly to a structure of a socket.

DESCRIPTION OF THE PRIOR ART

A pneumatic tool is commonly used as a power source to for example mount a wheel rim to an automobile or to remove a wheel rim from an automobile so that through proper attachment to a socket, the tool can be operated to tighten or loosen nuts.

However, the socket that attaches to the pneumatic tool must be of certain level of stiffness in order to avoid undesired deformation, and is thus commonly made of metals. When the socket is applied to tighten or loosen nuts or during pre-operations or post-operations thereof, it readily occurs that the socket hits the wheel rim, leading to scratching on the rim. This may be a situation that is hard to be accepted for a picky vehicle owner or a vehicle owner whose wheel rim (such as an aluminum alloy rim) is highly expensive. Consequential disputes are quite common between the automobile maintenance garages and the vehicle owners.

Due to such reasons, it is common for some vehicle maintenance garages to cover the socket with a relatively soft article, such as a piece of fabric, in order to avoid scratching to the wheel rim. This is tedious in operation and often makes it hard to fit the socket into openings in the wheel rim, making it generally inoperable. For such reasons, sockets that are covered with a plastic casing have been developed. However, a plastic casing that is too thin may not provide a proper effect of protection; and a plastic casing that is too thick prevents the extension of the socket into the openings in the wheel rim. Further, this may require reduction of the outside diameter of the socket, leading to lowering of overall stiffness. In addition, combining the plastic casing to the socket is generally done with a relatively tight surface contact therebetween and this makes parts assembling difficult.

SUMMARY OF THE INVENTION

In view of the above, in order to overcome the drawbacks of the prior art that a socket may easily cause scratching on a wheel rim, an externally-attached object around a socket makes use thereof inconvenient, provides only limited protection, makes extension into a wheel rim difficult, has an insufficient overall stiffness, and suffers difficulty in assembling, the present invention aims to provide a socket structure that comprises a socket body, an O-ring, and a carbon-fiber tube. The socket body includes a driving section and an acting section coaxially connected to the driving section. The driving section has an outside diameter greater than an outside diameter of the acting section such that a stepped portion is formed between outer circumferential surfaces of the driving section and the acting section. The driving section has a free end face that is recessed inwardly in an axial direction to form a driving hole. The acting section has a free end face that is recessed inwardly in an axial direction to form an acting hole. The outer circumferential surface of the acting section is surrounded with a circumferential groove formed therein. The O-ring is fit into and received in the circumferential groove of the socket body. The carbon-fiber tube is fit over the outer circumferential surface of the acting section of the socket body and has an end in abutting engagement with the stepped portion and an internal circumferential surface in contact with the O-ring. As such, effects of avoiding scratching a wheel rim, improving easiness of use, enhancing protection, being adaptable to an existing wheel rim, ensuring overall stiffness, and being easy to assemble can be achieved.

DETAILED DESCRIPTION OF THE PREFERRED EMBODIMENT

Figure 1:
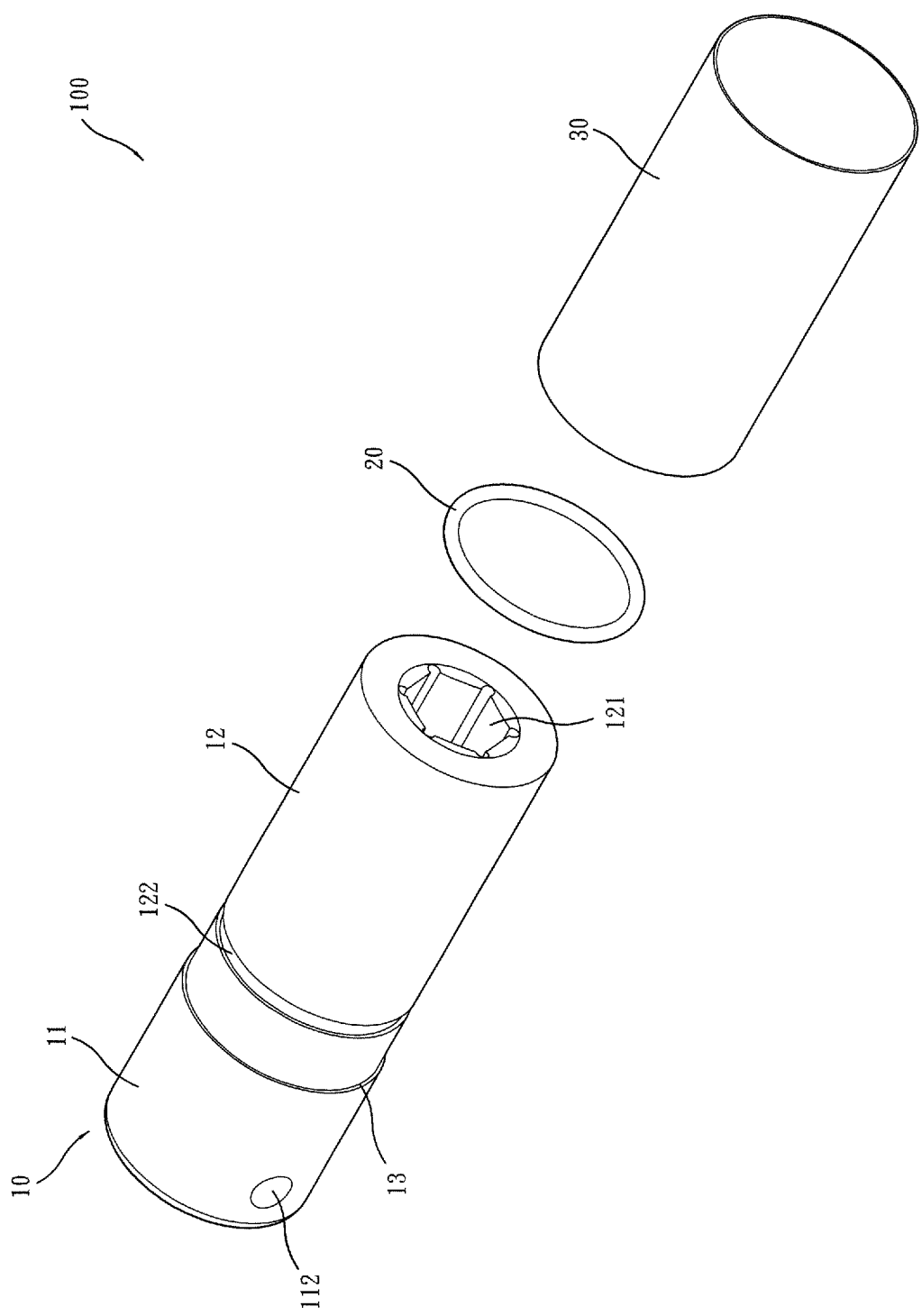
FIG. 1 is a perspective view, in an exploded form, showing a preferred embodiment of the present invention.
Figure 2:
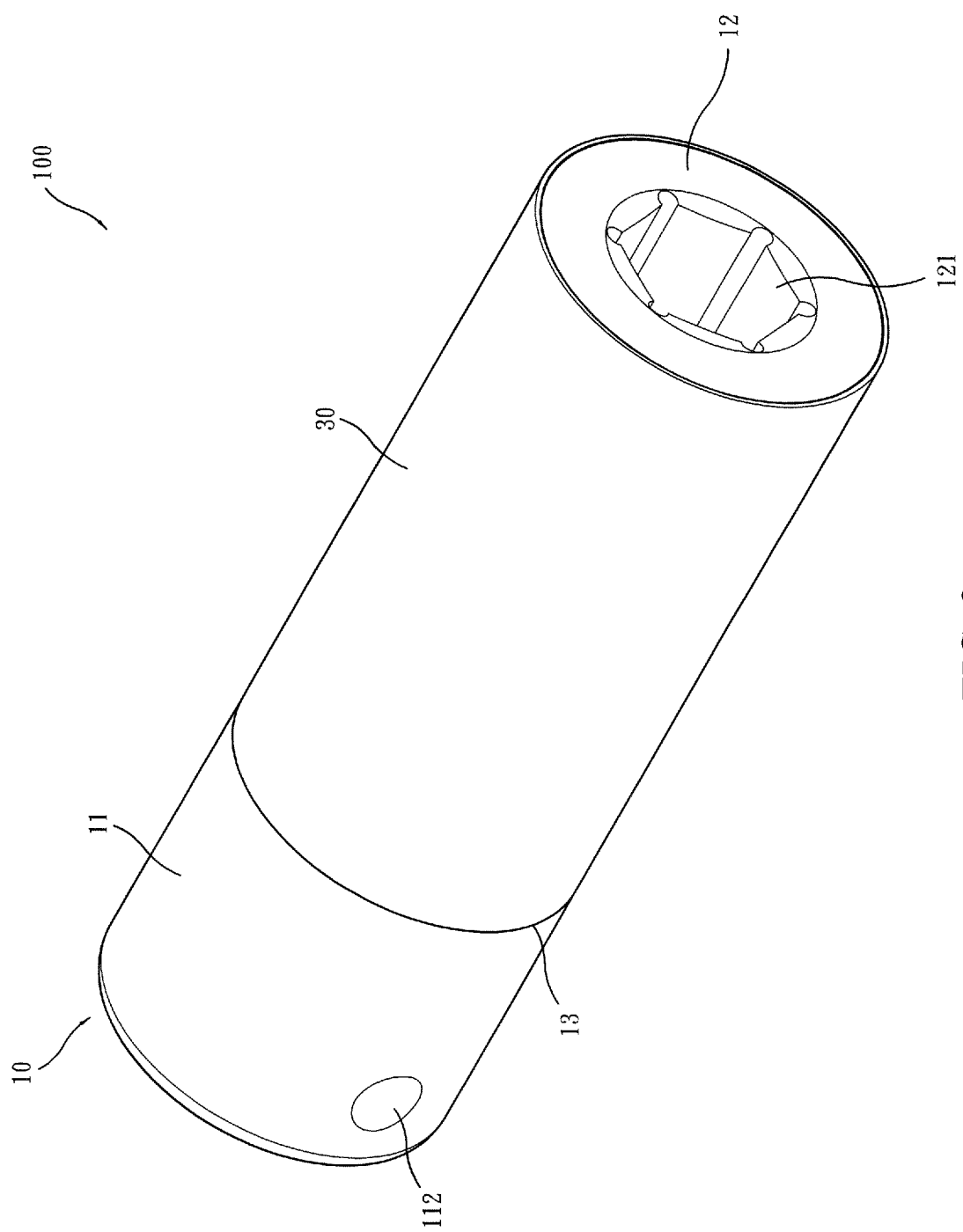
FIG. 2 is a perspective view, in an assembled form, showing the embodiment of FIG. 1.
Figure 3:
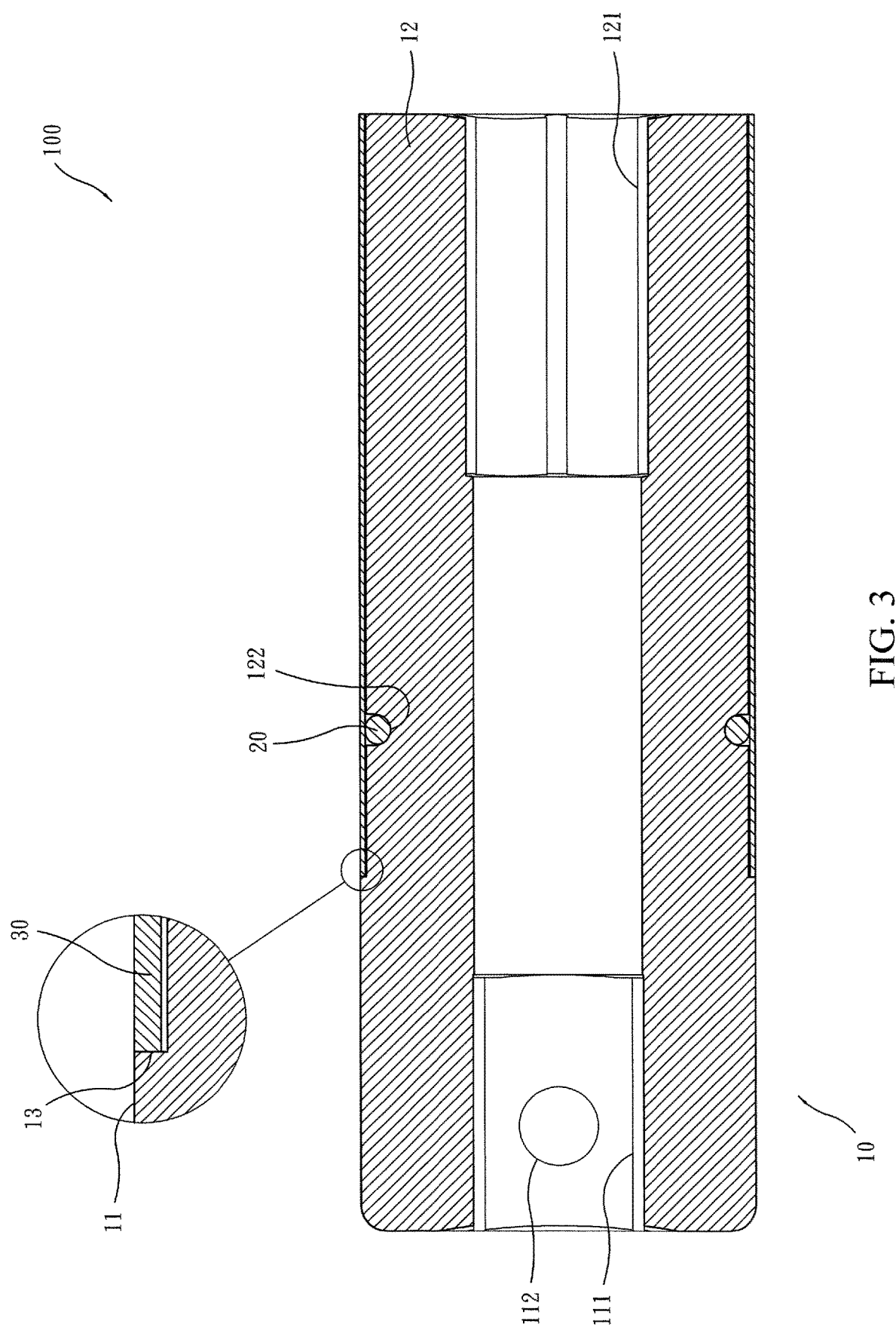
FIG. 3 is a cross-sectional view showing the embodiment of FIG. 1 in an assembled form, together with a close-up of a circled portion.

For better understanding and recognition of the features and advantages of the present invention, a detailed description will be given below to an embodiment of the present invention, with reference being had to the attached drawings:

Referring to FIGS. 1-3, a socket structure provided according to a preferred embodiment of the present invention is generally designated at 100 and generally comprises a socket body 10, an O-ring 20, and a carbon-fiber tube 30.

Referring to FIGS. 1-3, the socket body 10 is a one-piece, integrally formed cylindrical barrel. The socket body 10 includes a driving section 11 and an acting section 12 integrally and coaxially connected with the driving section 11. The driving section 11 has an outside diameter that is greater than an outside diameter of the acting section 12 so that a stepped portion 13 is formed at the connection between the driving section 11 and the acting section 12 as extending along outer circumferential surfaces of the two sections. The driving section 11 has a distal, free end face that is recessed inwardly, in a portion at an axial center thereof, to form a driving hole 111 that extends inwardly. In the instant embodiment, the driving hole 111 is a quadrilateral hole. The driving section 11 is formed, in the outer circumferential surface thereof, with a positioning hole 112 to penetrate through a center thereof in a radial direction. The acting section 12 has a distal, free end face that is recessed inwardly, in a portion at an axial center thereof, to form an acting hole 121 that extends inwardly. In the instant embodiment, the acting hole 121 is a hexagonal hole. The acting section 12 is formed, in the outer circumferential surface thereof, with a circumferential groove 122 that circumferentially surrounds the section.

Referring to FIGS. 1-3, the O-ring 20 is a one-piece, integrally-formed circular ring that is made of rubber or other elastic materials. The O-ring 20 is received in and encompasses the circumferential groove 122 of the socket body 10 in a manner of partly protruding outside the circumferential groove 122.

Referring to FIGS. 1-3, the carbon-fiber tube 30 is an axial hollow tubular object made of carbon fiber. The carbon-fiber tube 30 is fit over and encloses the outer circumferential surface of the acting section 12 of the socket body 10 in such a manner that an end of the carbon-fiber tube is set in abutting engagement with the stepped portion 13 and an internal circumferential surface of the carbon-fiber tube in contact engagement with the O-ring 20, so that an outer circumferential surface of the carbon-fiber tube 30 is flush with or in alignment with the outer circumferential surface of the driving section 11 and the internal circumferential surface of the carbon-fiber tube 30 is spaced from the outer circumferential surface of the acting section 12 by a gap. The carbon-fiber tube 30 has a tubular wall that has a thickness in the range of 0.3 mm-0.8 mm.

The above provides a description to the components, as well as assembly thereof, of the socket structure 100 according to a preferred embodiment of the present invention. A description concerning advantages of the present invention in the use thereof will be provided below.

Firstly, the carbon-fiber tube 30 can be made with an extremely thin tubular wall and such a tubular wall, even being extremely thin, provides a sufficient level of hardness (the hardness of which is still lower than metals), so that the carbon-fiber tube 30 that possesses such an extremely thin tubular wall, when fit over and combined with the socket body 10, shows only a minor increase in the outside diameter of the combined structure, making it possible to be readily used in any existing wheel rims. As the overall outside diameter is not increased significantly, there is no need to reduce the original outside diameter of the socket body 10, while a desired level of overall stiffness can be maintained. Further, the hardness of the carbon-fiber tube 30 also provides an effect of resisting wear and abrasion to extend the lifespan, so as to avoid any damage that the present invention may cause on a wheel rim and also exhibits effects of being easy to use, having bettered protection, being adaptable to any existing wheel rim, and ensuring overall stiffness.

Secondly, the carbon-fiber tube 30, when fit over and combined with the socket body 10, is not put in surface-to-surface contact with the socket body 10 and is only in contact with the O-ring 20, so that an effect of easy assembling is achieved and replacement of consuming parts, such as the carbon-fiber tube 30 and the O-ring 20, is also made easy.

Further, although in the above embodiment, the present invention is structured with just one single circumferential groove 122 and one single piece of O-ring 20, the numbers of the circumferential groove 122 and the O-ring 20 may be increased to be multiple ones if desired, in order to fit the socket body 10 and the carbon-fiber tube 30 to each other in a more tight and more secured manner.

In addition, although in the above embodiment, the driving hole is a quadrilateral hole and the acting hole is a hexagonal hole, in actual applications, the driving hole and the acting hole may each be any one of for example a quadrilateral hole, a hexagonal hole, and octagonal hole, a dodecagonal hole, and a hexagram hole (a star-shaped hole).

I claim:

1. A socket structure, comprising:
a socket body, which comprises a driving section and an acting section coaxially connected to the driving section, the driving section having a free end face that is partly and axially recessed inward to form a driving hole, the acting section having a free end face that is partly and axially recessed inward to form an acting hole having a predetermined depth in the axial direction from the free end face of the acting section, the acting section having an outer circumferential surface that is surrounded with at least one circumferential groove formed therein;
at least one O-ring, which is fit and received in the circumferential groove of the socket body; and
a carbon-fiber tube, which is fit over the outer circumferential surface of the acting section of the socket body and has an internal circumferential surface in contact engagement with the O-ring;
wherein the driving section of the socket body has an outside diameter that is greater than an outside diameter of the acting section, such that a stepped portion is formed at a connection site between an outer circumferential surface of the driving section and the outer circumferential surface of the acting section;
wherein the carbon-fiber tube has an end in abutting engagement with and supported on the stepped portion, such that an outer circumferential surface of the carbon-fiber tube is in alignment with an outer circumferential surface of the driving section of the socket body; and the carbon-fiber tube has an opposite end that is distant from the stepped portion, the opposite end of the carbon-fiber tube being flush with the free end face of the acting section;
wherein the internal circumferential surface of the carbon-fiber tube that is in contact engagement with the O-ring is separated from the outer circumferential surface of the acting section by the O-ring, and a gap is formed between the internal circumferential surface of the carbon-fiber tube and the outer circumferential surface of the acting section; and
wherein the carbon-fiber tube is made of a carbon-fiber based material having a given axial length and a fixed inside diameter and a fixed outside diameter throughout entirety of the given axial length of the carbon-fiber tube, and the socket body is of a one-piece structure made of a metallic material, the acting section that is made of the metallic material of the one-piece structure having a predetermined axial length including a groove-forming portion in which the circumferential groove is formed and a remaining portion other than the groove-forming portion, the metallic material of the acting section having a fixed external diameter throughout the remaining portion of the predetermined axial length of the acting section, wherein the given axial length of the carbon-fiber based material corresponds to the predetermined axial length of the metallic material of the acting section and the fixed inside diameter of the carbon-fiber based material is greater than the fixed external diameter of the metallic material, such that the carbon-fiber based material corresponds to and directly faces the metallic material axially and circumferentially throughout the given axial length of the carbon-fiber tube and the predetermined axial length of the acting section, and the carbon-fiber based material is spaced from the metallic material throughout the given axial length of the carbon-fiber tube in a radial direction by the O-ring received in the circumferential groove formed in the groove-forming portion of the predetermined axial length of the metallic material, and wherein the predetermined axial length of the metallic material of the acting section is greater than the predetermined depth of the acting hole, such that the carbon-fiber based material of the carbon-fiber tube that corresponds to and directly faces the metallic material of the acting section axially and circumferentially throughout the given axial length of the carbon-fiber tube and the predetermined axial length of the acting section extends in the axial direction from the free end face of the acting section for a range that completely covers the acting hole, and wherein connection site between the outer circumferential surface of the driving section and the outer circumferential surface of the acting section where the step portion is formed corresponds to a portion of the socket body between and axially spaced from the acting hole and the driving hole, such that the given axial length of the carbon-fiber tube is located between the free end face of the acting section and the step portion and the outer circumferential surface of the carbon-fiber tube and the outer circumferential surface of the driving section jointly form a smooth outer circumferential surface, the carbon-fiber tube and the socket body together providing a common, smooth outer circumferential surface extending axially from the free end face of the acting section toward the free end face of the driving section.

2. The socket structure according to claim 1, wherein the driving hole of the socket body is a quadrilateral hole.

3. The socket structure according to claim 1, wherein the acting hole of the socket body is a hexagonal hole.

4. The socket structure according to claim 1, wherein the driving section of the socket body has an outer circumferential surface that is formed with a positioning hole penetrating through a center in a radial direction.

5. The socket structure according to claim 1, wherein the O-ring is a one-piece integrally formed circular ring made of an elastic material.

6. The socket structure according to claim 1, wherein the carbon-fiber tube has a tubular wall having a thickness between 0.3 mm and 0.8 mm.

\* \* \* \* \*